United States Patent
Belzner et al.

(10) Patent No.: US 9,528,841 B2
(45) Date of Patent: Dec. 27, 2016

(54) METHOD FOR CONTROLLING THE PROVISION OF TRAFFIC INFORMATIONAL DATA IN ORDER TO UPDATE TRAFFIC INFORMATION

(71) Applicant: Bayerische Motoren Werke Aktiengesellschaft, Munich (DE)

(72) Inventors: Heidrun Belzner, Seefeld (DE); Georg Obert, Garmisch-Partenkirchen (DE); Ronald Kates, Otterfing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/489,951

(22) Filed: Sep. 18, 2014

(65) Prior Publication Data

US 2016/0025510 A1  Jan. 28, 2016

Related U.S. Application Data

(63) Continuation of application No. PCT/EP2013/054369, filed on Mar. 5, 2013.

(30) Foreign Application Priority Data

Mar. 19, 2012  (DE) .................. 10 2012 204 306

(51) Int. Cl.
*G01C 21/30*  (2006.01)
*G01C 21/32*  (2006.01)
(Continued)

(52) U.S. Cl.
CPC ......... *G01C 21/3492* (2013.01); *G08G 1/0112* (2013.01); *G08G 1/0129* (2013.01);
(Continued)

(58) Field of Classification Search
CPC ..................... G01C 21/3492; G08G 1/091
(Continued)

(56) References Cited

U.S. PATENT DOCUMENTS 5,760,709 A * 6/1998 Hayashi .............. G07B 15/063
   340/923
5,812,069 A * 9/1998 Albrecht .............. G08G 1/0104
   340/905

(Continued)

FOREIGN PATENT DOCUMENTS

CN   1952993 A   4/2007
DE   196 43 454 A1   4/1998
(Continued)

OTHER PUBLICATIONS

International Search Report dated Jul. 4, 2013 (Three (3) pages).
(Continued)

*Primary Examiner* — Jaime Figueroa
(74) *Attorney, Agent, or Firm* — Crowell & Moring LLP

(57) ABSTRACT

In a method for controlling provision of traffic informational data for updating traffic information, traffic information that was previously valid on a route section, and that was provided by a traffic service provider, for example, is allocated a first added value. A second time value is determined for traffic information on the route section updated virtually by traffic informational data generated from a vehicle. From a comparison of the first and second time values, a priority ratio may be obtained as a measured value for the benefit of transferring the traffic informational data generated in the vehicle to a traffic service provider for updating traffic information that was previously valid at the traffic service provider.

20 Claims, 2 Drawing Sheets

(51) Int. Cl.
    *G01C 21/34* (2006.01)
    *G08G 1/01* (2006.01)
    *G08G 1/09* (2006.01)
(52) U.S. Cl.
    CPC ......... *G08G 1/0133* (2013.01); *G08G 1/0141* (2013.01); *G08G 1/091* (2013.01)
(58) Field of Classification Search
    USPC ................. 701/117, 118, 119, 414, 423, 533
    See application file for complete search history.

(56) References Cited

U.S. PATENT DOCUMENTS

| | | | | |
|---|---|---|---|---|
| 6,259,377 | B1* | 7/2001 | Noecker | G08G 1/09 340/905 |
| 7,899,612 | B2* | 3/2011 | Kumagai | G08G 1/0104 340/934 |
| 7,908,075 | B2* | 3/2011 | Qi | G06F 17/30241 340/995.13 |
| 9,117,098 | B2* | 8/2015 | Trombley | G06G 1/00 |
| 2005/0080552 | A1 | 4/2005 | Feldman et al. | |
| 2005/0093720 | A1* | 5/2005 | Yamane | G01C 21/3492 340/995.13 |
| 2005/0288856 | A1* | 12/2005 | Uyeki | G01C 21/3415 701/423 |
| 2006/0082472 | A1* | 4/2006 | Adachi | G08G 1/096716 340/995.13 |
| 2006/0287818 | A1* | 12/2006 | Okude | G01C 21/3492 701/423 |
| 2007/0088489 | A1 | 4/2007 | Tsuge | |
| 2007/0208497 | A1* | 9/2007 | Downs | G08G 1/0104 701/117 |
| 2008/0071465 | A1* | 3/2008 | Chapman | G01C 21/3691 701/117 |
| 2008/0215233 | A1* | 9/2008 | Adachi | G01C 21/3691 701/118 |
| 2008/0262716 | A1* | 10/2008 | Li | G08G 1/01 701/533 |
| 2010/0121522 | A1 | 5/2010 | Wolfson et al. | |
| 2011/0173015 | A1 | 7/2011 | Chapman et al. | |

FOREIGN PATENT DOCUMENTS

| | | |
|---|---|---|
| DE | 10 2007 060 590 A1 | 6/2009 |
| DE | 10 2008 022 349 A1 | 11/2009 |
| EP | 0 880 120 A2 | 11/1998 |
| WO | WO 2004/059592 A1 | 7/2004 |

OTHER PUBLICATIONS

German Search Report dated Feb. 25, 2013, with Statement of Relevancy (Six (6) pages).
Chinese Office Action issued in Chinese counterpart application No. 201380015132.5 dated Aug. 21, 2015, with English translation (Eighteen (18) pages).
Chinese Office Action issued in Chinese counterpart application No. 201380015132.5 dated Apr. 14, 2016, with English translation (Nine (9) pages).

* cited by examiner

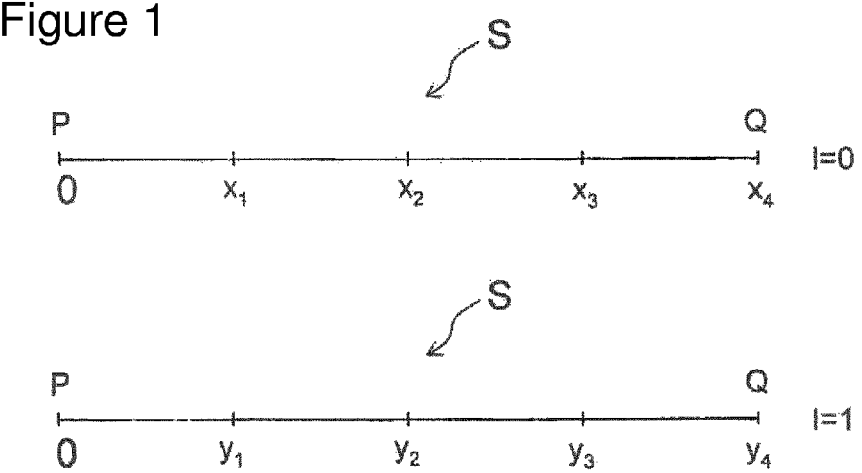
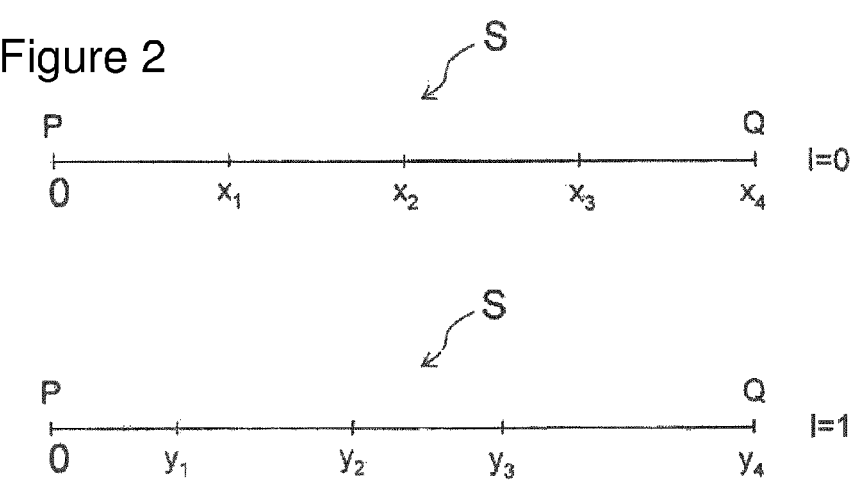

METHOD FOR CONTROLLING THE PROVISION OF TRAFFIC INFORMATIONAL DATA IN ORDER TO UPDATE TRAFFIC INFORMATION

CROSS REFERENCE TO RELATED APPLICATIONS

This application is a continuation of PCT International Application No. PCT/EP2013/054369, filed Mar. 5, 2013, which claims priority under 35 U.S.C. §119 from German Patent Application No. 10 2012 204 306.3, filed Mar. 19, 2012, the entire disclosures of which are herein expressly incorporated by reference.

BACKGROUND AND SUMMARY OF THE INVENTION

The invention relates to a method for controlling provision of traffic informational data for updating traffic information.

So that the driver of a vehicle is informed about the status of traffic on a road, traffic informational data from a service provider may be made available. Traffic informational data may also be generated in the vehicle itself in that driving behavior on the route being driven is analyzed. Thus it may be detected, for instance, whether traffic information provided by a service provider is actually still valid on the route section being traveled. To attain improved quality of traffic information for vehicles, traffic data that have been generated in vehicles while a route is being traveled may be transferred to a control center. In the control center, the valid traffic information transferred from vehicles may be compared to the traffic status data available there and may be updated in to order broadcast improved traffic information.

Traffic data may be transmitted from the vehicles on a route section, for instance in the form of a so-called "string of pearls." Strings of pearls include time series of geo-referenced positions, that is, each point has a time stamp that is made up of geographic lengths and widths obtained from GPS signals, and possibly information on link, direction of travel, and offset. In addition, vehicle-generated data with a highly expanded information spectrum may be generated and transferred. Data of this type are called XFCD (Extended Floating Car Data). In the control center, vehicle-generated data like XFCD may be linked to other data sources and used for generating updated traffic information It is true that, for the purpose of updating, strings of pearls may be transferred continuously from every vehicle equipped with a transmitter device to a traffic service provider. However, permanent transfer of data from the vehicle is associated with direct and indirect costs. Among the direct costs are for instance the fees of mobile wireless providers. Indirect costs may be incurred when, for instance, a mobile wireless channel is overloaded and this leads to it not being possible to transmit important messages. In this case, different claims on communication would compete with one another.

However, it is also possible to generate traffic informational data in vehicles, with the transfer of this data to a central traffic service provider appearing entirely reasonable. For instance, if the traffic information of a service provider that is already present in the vehicle indicates a significantly longer travel time on a route section compared to ideal conditions and if, at the same time, while traveling the route section the vehicle determines a "no traffic jam" traffic status, the transfer of the newly-obtained traffic information in the vehicle to the traffic service provider might appear entirely reasonable. In this example, when the "no traffic jam" traffic status is determined, there are circumstances in which the transfer of a string of pearls nevertheless produces added value compared to non-transfer. Conversely, if there is a determination of a "traffic jam" traffic status in the vehicle, the transfer of a message might in some circumstances produce only minor added value, if for instance the traffic information of the traffic service provider that is already available results in a correct or nearly correct travel time.

It is desirable to provide a method for controlling provision of traffic informational data for updating traffic information in which the most recently acquired traffic informational data is not transferred to a traffic service provider of traffic information unless it has added value compared to the traffic informational data previously available from the service provider.

Claim 1 provides one embodiment of a method for controlling provision of traffic informational data for updating traffic information. The method for controlling provision of traffic informational data for updating traffic information may include the following acts:

Provision of first traffic informational data that on first route sections of a route represent a first traffic information status and of second traffic informational data that on second route sections of the route represent a second traffic information status, wherein the first traffic informational data represent a temporally older traffic information status than the second traffic informational data;

Determination of a plurality of first travel times for each of the first route sections as a function of the first informational data;

Determination of at least one characteristic value of a distribution of the first travel times for each first route section;

Determination of a plurality of second travel times for each of the second route sections as a function of the second traffic informational data;

Determination of at least one characteristic value of a distribution of the second travel times for each second route section;

Determination of a first time value for traffic information based on the first traffic informational data as a function of the determined characteristic value of a distribution of the first travel times, wherein the first time value represents a measure of the benefit of the first traffic informational data;

Determination of a second time value for another traffic information status based on a combination of the first traffic informational data and the second traffic informational data as a function of the determined characteristic value of a distribution of the second travel times, wherein the second time value represents measure for the benefit of the second traffic informational data;

Comparison of the first and second time values and provision of the second traffic informational data for updating the first traffic informational data as a function of the comparison of the first and second time values.

With this given method, the added value that the transfer of the second traffic informational data, as currently determined in a vehicle, for updating the first traffic informational data already known by a traffic service provider would result in may be determined. The traffic informational data transmitted from the service provider to a vehicle may for instance include the estimated travel time for a route section and a characteristic value regarding the confidence of this estimate.

The method may be used both for controlling the transfer of data generated in the vehicle on established route sections and for controlling the transfer of data generated in the vehicle for variable traffic-adaptive route sections. In both application instances, initially a first time value is determined for traffic information that is based on the first traffic informational data. The first time value indicates a benefit that the initial traffic informational data have for a vehicle on a route section. Moreover, a second time value is determined for "updated" traffic information that is based on the first traffic informational data that has been updated with the second traffic informational data. The second time value thus provides a benefit that the "updated" traffic information would have for a vehicle on the route section. By comparing the two time values it is possible to determine a priority ratio that indicates whether the transfer of the second traffic informational data generated in the vehicle to a traffic service provider, for updating traffic information, represents an added value compared to traffic information that is already known.

The second traffic informational data are only transferred from the vehicle to the service provider if, for instance, the priority ratio exceeds a certain order of magnitude. Thus the method enables intelligent global control of the entirety of messages, in particular XFCD messages, in that the determined priority ratio is compared to a threshold value that is transferred, for instance, to a vehicle. Moreover, the method permits the efficiency of the benefit of available communication resources to be improved and ultimately permits the quality of the traffic information provided in a vehicle by a service provider to be improved.

A series of additional useful embodiments of the method shall be provided in the following.

In accordance with one possible embodiment of the method, an average speed may be calculated on each second route section when the section is traveled. The second traffic informational data may be provided for each second route section as a function of the average speed on that second route section, the length of that second route section, and a free speed on that second route section.

In accordance with another embodiment of the method, a plurality of travel times are determined for each second route section as a function of the second traffic informational data. The first and second time values may be determined as a function of the plurality of travel times determined for each second route section.

In accordance with another embodiment of the method, a free travel time may be determined on each second route section. The free travel time allocated to a second route section may be determined as a function of a length of that second route section and of the free travel speed allocated to that second route section. The first and second time values may be determined as a function of the free travel time determined for each second route section.

The method may be used in a first application instance, in which the first and second route sections are the same, because for instance the route sections are fixed and predefined. The method may also be used in a second application instance, in which the first and second route sections are different, because the sections are divided variably or in a traffic adaptive manner. Possible embodiments of the invention for the second application instance shall now be described in greater detail in the following.

In accordance with one possible embodiment of the invention, the second route sections may be defined on the route between a starting point and a target point in that the route is traveled and, between a begin point that is disposed between the starting point and the target point, and a traveled route position of the route, one of the second route sections is defined when a first traffic status between the begin point and the just traveled route position differs from an expected second traffic status between the route position and the target point. Thus, with respect to the just traveled route position, the second traffic status is thus investigated in a spatial window "upstream" of the most recently traveled route position.

In accordance with one useful embodiment of the method, the second route sections may be defined on the route between the starting point and the target point in that the starting point is established as begin position for one of the second route sections and when the route is traveled the following steps (a) through (e) are executed:

(a) Determination of an expected value of a first speed between the begin point and a traveled route position on the route;

(b) Determination of an average value of a second speed in a spatial range between the traveled route position and the target point;

(c) Comparison of the expected value of the first speed and the average value of the second speed;

(d) Establishment of an end point for the one section of the second route sections as a function of the comparison performed in step (c);

(e) Establishment of the one section of the second route sections between the begin point and the endpoint and definition of the end point as begin point for a second subsequent route section on the established second route section and repetition of steps (a) through (e) if the target point has not yet been traveled, and establishment of the one section of the second route sections between the begin point and the target point if the target point has already been traveled.

In accordance with another embodiment of the method, the second route sections are defined in that a standard deviation of the second speed in the spatial region between the traveled route position and the target point is determined and, as a function of the standard deviation, a limit is determined which, if exceeded, indicates a significant change in the traffic status. When the expected value for the first speed is compared to the average value of the second speed, now a difference between the expected value of the first speed and the average value of the second speed may be determined and compared to the limit.

In accordance with another embodiment of the method, a quantile is determined as characterizing value, wherein a median travel time may be determined as a quantile of a distribution of the first travel times on each of the first route sections. Virtual median travel times based on the first traffic informational data are allocated to the second route sections in that the median travel times for the first route sections are interpolated into the second route sections. The first time value may then be determined as a function of the virtual median travel time allocated to each second route section. Likewise, a median travel time may be determined as a quantile of a distribution of the second travel times on each of the second route sections. The second time value is then determined as a function of the median travel time allocated to each second route section.

The invention shall be explained in greater detail in the following using exemplary embodiments that are illustrated using the figures.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a division of a route into fixed route sections for first and second traffic informational data;

FIG. 2 is a division of a route into variable traffic-adaptive route sections for first and second traffic informational data;

DETAILED DESCRIPTION OF THE DRAWINGS

Figure 3A:
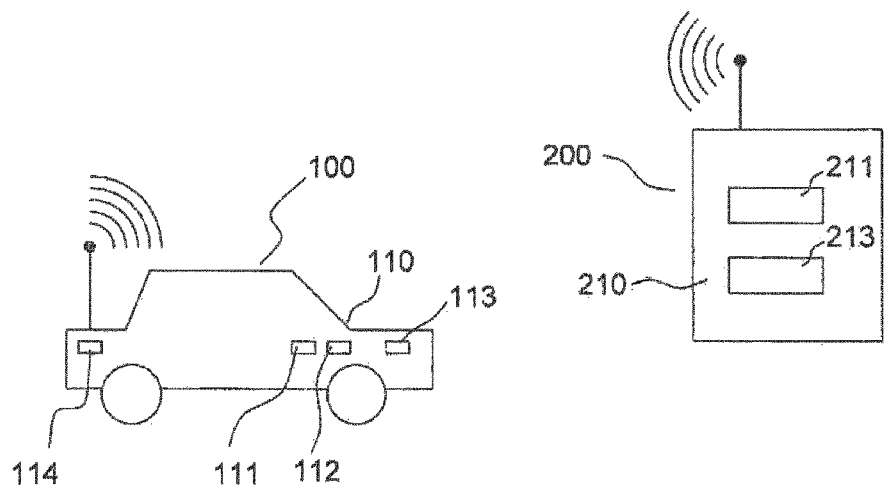
FIG. 3A is an embodiment of a system arrangement for controlling provision of traffic informational data for updating traffic information.

A model is provided in the following in order to allocate, to traffic information on a route section, a time value that characterizes the benefit of the traffic information for a vehicle on the route section. This model is then used for allocating a benefit for the transfer of a string of pearls. The allocation is attained in accordance with the method in that the relative increase in added value, as the result of the transfer of a temporally newer string of pearls, is estimated by comparing it to the value of the information that is already available.

The first step in the above solution is found in a model in order to allocate, for a route section A with the "free" travel time $T_{min}$, a value for the benefit of traffic information and to estimate the added value of the transfer of a temporally "new" string of pearls that is not temporally as old. The free travel time $T_{min}$ indicates a travel time that is achievable on the route section under ideal conditions.

In addition, N—possibly hypothetical—independent observations of the travel time $T_i$ are considered, where i=1, 2, . . . , N, as they are, for instance, experienced by a number of N vehicles on the route section A. These observations are compared to a travel time $<T>$ reported for a vehicle for the route section A by a traffic service provided. Because of this, a time value G may be determined using $$G = -\Sigma_{i=1}^{N}(\langle T \rangle_i - T_{min}) + \phi \Sigma_{i=1}^{N}[(T_i - T_{min}) - \max(T_i - \langle T \rangle_i, 0)]. \quad (1)$$

for updated traffic information based on the traffic informational data determined in the N vehicles and on the traffic informational data of the service provider. The time value G thus represents a measure for the time saved on route section A when the updated traffic information, which may have been generated from a fusion of the traffic informational data generated in the vehicle and the temporally older traffic informational data of the traffic service provider, is available in the vehicle.

The factor $\phi$ in Equation (1) may be selected for instance as a function of the street class of the route section A. For instance, $\phi$ may be selected to be $\phi=2$ for grade-separated roads and $\phi=3$ for roads that are not grade-separated.

In accordance with the model provided above, for the time value G a monetized added value M0 may be estimated as follows:

$$M0 = G \cdot Zf \cdot F \quad (2a)$$

In Equation (2a), G represents the time value from Equation (1), Zf is a time factor that indicates the averaged benefit of the updated traffic information for vehicles on the route section A, and F indicates the number of vehicles that receive the updated traffic information on the route section A. The number of vehicles F that receive the updated traffic information on the route section A is indicated with $$F = V \cdot D \cdot Pf \quad (2b)$$

In Equation (2b), the parameter V indicates the traffic on the route section A, parameter D represents the validity time of the traffic information period, and the parameter Pf indicates the capacity rate of vehicles on the route section A.

Assuming that the time factor Zf is the same for all vehicles on the route section A, as a measure for the added value of traffic information, Equation (2a) may be simplified to $$M = G \cdot F \quad (2c)$$

To allocate to the traffic informational data most recently acquired in the vehicle, a priority ratio PZ, which is a measured value for the benefit of providing the most recent traffic informational data for updating the previous traffic informational data, it is assumed that, using the new traffic informational data, the traffic data provider can calculate an "updated" traffic information status. The updated traffic information status is merely estimated virtually in the vehicle and this estimation does not necessarily correspond to a data fusion process conducted by the traffic data provider.

In order to now allocate the priority of message of traffic informational data to a string of pearls that may be transferred, a time value $G_1$ of the traffic information updated virtually in the vehicle and a time value $G_0$ of the previous traffic information status are compared to one another. This results in the priority ratio PZ for the updated message:

$$PZ = (G_1 - G_0) \cdot F \quad (3)$$

The supply of traffic informational data for a route section from a traffic service provider may be complete, partial, or entirely absent on the route section. If there is no traffic message for a section, it is reasonable to differentiate two potential situations for the traffic service provider.

In the first case, the completeness of the supply of the route section by the traffic information service is present or is not confirmed, and no valid traffic message is available. In these circumstances, when there is an absence of a traffic message in the vehicle, it is therefore not known whether or not there is a traffic message for the route section with the traffic service provider. In this case, the transfer of traffic informational data that have been acquired on the traveled route section may be controlled merely using a vehicle-internal method.

In the second case, there is complete coverage of traffic information on the route section by the traffic information service. If it may be assumed that the traffic information provider would report a traffic jam on the route section if the traffic service provider had such information, the absence of an explicit traffic message in the vehicle may be equated to a "no traffic jam" traffic status with the service provider.

In the following a method for controlling provision of traffic informational data that have been acquired in a vehicle while traveling a route section for updating traffic informational data previously available to the service provider is given for the latter considered case.

It is a prerequisite that in the vehicle while traveling the route section, "new" traffic informational data are determined that are provided for the method for instance as a string of pearls. Moreover, "old" traffic informational data that have been provided by the traffic service provider for the traveled route section should be present in the vehicle. The traffic informational data define a traffic information status. A traffic information status shall be construed to mean either the absence of a message or an actual traffic message with information on speed or travel time on the route section, and where possible with information on the how inexact of this information. The requirements for this information are presented in the following.

For a route section A, information on the length L of the section and on a free speed $V_{free}$ must be available on the route section. To describe the traffic status at a time t on a route section A, first an auxiliary variable u according to $$u \equiv U \mid T_{min} = \frac{T - T_{min}}{T_{min}} = \frac{V_{free}}{V} - 1 \quad (4)$$

is defined for a travel time T or for an average speed V. The auxiliary variable u indicates a relative travel time loss on the route section A. A suitable statistical framework is needed to formulate a solution for the problem at hand. To this end, it is assumed that the travel time T actually experienced on the route section represents the result of one random sample. Since in the same traffic status different random samples could lead to different values for the travel time T, the variable u=u(t) is consequently considered a random variable. A traffic status θ corresponds to information on parameters θ=[a, B] of a probability distribution for the relative travel time loss u. The probability distribution may be modeled as a gamma distribution as $$F(u; B, a) = \frac{B^a u^{a-1} \exp(-Bu)}{\Gamma(a)} \quad (5)$$

In this model, the parameter a is considered known for the route section A. The parameter a may be provided for instance as a function of the street class for the route section. For grade-separated roads, $$a = 100 \quad (6)$$

and for roads that are not grade-separated $$a \approx 0.09 * T \quad (7)$$

may be assumed, wherein T is the characteristic travel time (in seconds) between node points for the route section A.

In contrast, the parameter B is considered an inexact variable, that is, parameter B itself is described using a probability distribution $$P_I(B) = \frac{\beta_I^{\alpha_I} B^{\alpha_I - 1} \exp(-\beta_I B)}{\Gamma(\alpha_I)}, I = 0, 1, 2, \ldots \quad (8)$$

Parameter B here identifies the inverse scaling parameter of a gamma distribution. The index I in the formula of Equation (8) stands for different independent information sources. The index I=0 indicates, for instance, the information source of the traffic service provider, while the index I=1 indicates the information source of the vehicle. The parameters $\alpha_I$ and $\beta_I$ designate "hyperparameters" and may be determined in accordance with the formulas $$\alpha_I = \alpha_{I-1} + \alpha_{(I)} \text{ mit } \alpha_{(I)} = M_I \cdot \alpha \quad (9)$$

and $$\beta_I = \beta_{I-1} + \beta_{(I)} \text{ where } \beta_{(I)} = M_I \cdot \hat{u}_I \quad (10)$$

Both parameters $\{\hat{u}_I, M_I\}$ are allocated to each information source ("Bayesian posterior"). The parameter $\hat{u}_I$ indicates the estimated mean value of the relative travel time loss. The parameter M indicates a measure for the number of virtual random samples allocated to an information source.

In the following, a method for controlling provision of traffic informational data for updating traffic information may be provided. The method may be divided into the method steps provided in the following.

Provided as the starting basis for the method are traffic informational data $L_{0,k}$, $x_{0,k}$, $t_{min,0,k}$, $\hat{u}_{0,k}$, $M_{0,k}$, $a_{0,k}$, which on route sections k of a route S represent a first traffic information status, and traffic informational data $L_{1,j}$, $y_{1,j}$, $t_{min,1,j}$, $\hat{u}_{0,j}$, $M_{1,j}$, $a_{1,j}$, which on route sections j of the route S represent a traffic information status. The traffic informational data $L_{0,k}$, $x_{0,k}$, $t_{min,0,k}$, $\hat{u}_{0,k}$, $M_{0,k}$, $a_{0,k}$ represent a temporally older traffic information status than the second traffic informational data $L_{1,j}$, $y_{1,j}$, $t_{min,1,j}$, $\hat{u}_{1,k}$, $M_{1,j}$, $a_{1,k}$. With the given traffic informational data, the parameter $L_{I,k}$ indicates the length of a route section k, parameter $x_{I,k}$ represents a route position on the route section k, and parameter $t_{min,I,k}$ represents the free travel time on the route section k. The meaning of the parameters $\hat{u}_{I,k}$, $M_{I,k}$, $a_{I,k}$ has already been explained using the descriptions of Equations (8) and (9). Index I=0 indicates that the traffic informational data are traffic informational data provided by a traffic service provider. The significance of the traffic informational data $L_{I,j}$, $y_{I,j}$, $t_{min,I,j}$, $\hat{u}_{I,j}$, $M_{I,j}$, $a_{I,j}$ with I=1 is analogous to the previously explained parameters for route sections j of the route S. Index I=1 means that this traffic informational data is traffic informational data obtained from the string of pearls acquired in the vehicle.

If the traffic informational data $\hat{u}_0$ and $M_0$ are not made available directly from the traffic information service provider, it is at least assumed that information or assumptions about $\hat{u}_0$ and $M_0$ may be reconstructed with the information supplied by the traffic service provider. To determine $\{\hat{u}_1, M_1\}$, it is assumed that it is possible in the vehicle to obtain some conclusion about $\hat{u}_1$ from the string of pearls. For XFCD messages, it is possible to assume for $M_1$ the value $M_1=1$ or a greater value. Thus, together with the parameters $\alpha_I$, $\beta_I$, the parameters $\{\hat{u}_0, M_0\}$ and $\{\hat{u}_1, M_1\}$ characterize the probability distribution of the current travel time, which proceeds from the information from the traffic service provider (I=0) or from the string of pearls in the vehicle (I=1).

Now, with the following method steps, a measure for the added value of the traffic information in the vehicle $\{\hat{u}_1, M_1\}$ is determined compared to the already available traffic information of the message $\{\hat{u}_0, M_0\}$. First, a plurality i of travel times $T_{k,i}$ is determined for each of the route sections k as a function of the traffic informational data $L_{0,k}$, $x_{0,k}$, $t_{min,0,k}$, $\hat{u}_{0,k}$, $M_{0,k}$, $a_{0,k}$. For each route section k, at least one quantile $T_{0,p,k}$ of a distribution of the travel times $T_{k,i}$ is found. Likewise, for each of the route sections j, a plurality i of travel times $T_{i,j}$ is found as a function of the traffic informational data $L_{1,j}$, $y_{1,j}$, $t_{min,1,j}$, $\hat{u}_{1,j}$, $M_{1,j}$, $a_{1,j}$. For each route section j, at least one quantile $T_{1,p,j}$ of a distribution of the travel times $T_{i,j}$ is found. The parameter p therefore indicates the magnitude of the quantile.

Then a time value $G_0$ for traffic information based on the first traffic informational data $L_{0,k}$, $x_{0,k}$, $t_{min,0,k}$, $\hat{u}_{0,k}$, $M_{0,k}$, $a_{0,k}$ of a distribution of the travel times $T_{i,k}$ is found as a function of the determined quantile $T_{0,p,k}$. The time value $G_0$ represents a measure of the benefit of the traffic informational data $L_{0,k}$, $x_{0,k}$, $t_{min,0,k}$, $\hat{u}_{0,k}$, $M_{0,k}$, $a_{0,k}$ for a vehicle on a route section k. Moreover, a time value G1 is found for updated traffic information based on the previous traffic informational data $L_{0,k}$, $x_{0,k}$, $t_{min,0,k}$, $\hat{u}_{0,k}$, $M_{0,k}$, $a_{0,k}$ and the current traffic informational data $L_{1,j}$, $x_{1,j}$, $t_{min,1,j}$, $\hat{u}_{1,j}$, $M_{1,j}$, $a_{1,j}$ as a function of the determined quantile $T_{0,p,j}$ of a distribution of the travel times $T_{i,j}$. The time value $G_1$ represents a measure of the benefit of the traffic informational data $L_{1,j}$, $x_{1,j}$, $t_{min,1,j}$, $\hat{u}_{1,j}$, $M_{1,j}$, $a_{1,j}$ or a benefit of the updated traffic information. After the time values have been calculated, the time values $G_0$ and $G_1$ may be compared to one another. The current traffic informational data $L_{1,j}$, $y_{1,j}$, $t_{min,1,j}$, $\hat{u}_{1,j}$, $a_{1,k}$ generated in the vehicle are provided as a function of the comparison of the two time values $G_0$ and $G_1$ in order to update the traffic informational data $L_{0,k}$, $x_{0,k}$, $t_{min,0,k}$, $\hat{u}_{0,k}$, $M_{0,k}$, $a_{0,k}$ that are available with the traffic service provider.

For performing the comparison of the time values $G_0$ and $G_1$, for instance a priority ratio PZ may be determined that characterizes the benefit of the provision of the current traffic informational data obtained in the vehicle for updating the previous traffic informational data of the traffic service provider. The priority ratio PZ may be determined as a function of a difference in the time values $G_1$, $G_0$ and of a number of vehicles to which the updated traffic informational data are made available on the route section. Then for instance a threshold value may be specified. If the priority ratio PZ exceeds the specified threshold value, the more current traffic informational data $L_{1,j}$, $y_{1,j}$, $t_{min,1,j}$, $\hat{u}_{1,j}$, $M_{1,j}$, $a_{1,k}$ obtained in the vehicle are provided to the traffic service provider for updating the traffic informational data $L_{0,k}$, $x_{0,k}$, $t_{min,0,k}$, $M_{0,k}$, $a_{0,k}$ available there.

In the following the method shall first be explained for the instance in which the control of the transfer of traffic informational data generated in the vehicle occurs on established, pre-defined route sections.

To this end, FIG. 1 depicts a route S between a starting point P and a target point Q. For the traffic service provider, the route S is divided into the route sections k with route positions $x_1, \ldots, x_k$ where $k=1, \ldots, K$. Each route section k is arranged between two successive section positions $x_k$, $x_{k+1}$. The traffic informational data present with the traffic service provider relate to the route sections k. Such a route section k may be defined for instance using surrounding TMC locations.

The traffic informational data determined in the vehicle while traveling the route S are allocated to route sections j that are arranged between successive route positions $y_0, \ldots, y_j$ where $j=1, \ldots, J$. Since the division of the route S is fixed, the traffic informational data generated in the vehicle relate to the same route sections as the traffic informational data available to the traffic service provider. In this case, in other words, the route positions $x_k$ are the same as the route positions $y_k$, and thus the route sections k are the same as the route sections j.

The added value of updated traffic information is estimated by considering the benefit of the improved knowledge. For estimating this benefit, using the available data, virtual travel times are generated that are valid as representative random samples for the experience of other vehicle on a certain route section. Together with the length L of a route section and the free speed $V_{free}$ on the route section, the parameters $\{a, \alpha_I, \beta_I\}$ characterize knowledge available in the vehicle about the current probability of experiencing a certain travel time on a route section A. The parameters $\{a, \alpha_I, \beta_I\}$ are therefore used for generating these random samples.

The specific hyperparameters $\alpha_I$ and $\beta_I$ may be determined in accordance with Equations (8-9) from the specific parameters $\{\hat{u}_0, M_0\}$ and $\{\hat{u}_1, M_1\}$ and using the other parameters L, $V_{free}$, a, which due to the same route sections K, j, are identical for the previously valid traffic informational data and for the most recent, current traffic informational data. Virtual reported travel times are generated for the "old" information status of the message $\{\hat{u}_0, M_0\}$ that is already available and for the "new" information status.

To this end, first probability distributions for the relative travel time losses u are calculated for each information source I=0, 1, i.e. the traffic informational data previously provided by the traffic service provider, and for the traffic informational data currently determined in the vehicle with the calculated hyperparameters $\alpha_I$, $\beta_I$ and Equations (8) and (5). Thus, from Equation (4) the distribution of travel times is known for the "old" and for the "new" information status on a route section. Random samples of travel times on the route section are drawn from this for both the old and new information status. Quantiles with the order p={50, 60, 70, 80, 90} of the travel time distribution may be estimated for the old and new information status. These quantiles are each used with and without the new information for generating a virtually reported travel time in order also to take into account an added value when a "pessimistic" route selection is made. A "pessimistic" route between the starting point P and the target point Q, for instance, shall be construed to be a route that, although it does take more time, involves fewer unpredicted time delays.

For the old, previously known traffic information status of the message that is already present, characterized by the set of parameters $\{\hat{u}_0, M_0\}$ on a route section j and for the new, current traffic information status on the route section, the added value is now estimated using a cost/benefit model. To this end, N virtually experienced travel times $T_{i,j}$, where I=1, ..., N, for instance N=1000 travel times, are generated by vehicles on the route section j using the hyperparameter $\alpha_I$ or $\beta_I$ and the other parameters $\{L, V_{free}, a\}$ and Equations (8), (5), and (4). The added value "with and without" the new information is compared for these random samples using Equations (1-2c).

Thus, a time value $G_0$ for the old traffic information status may be determined with Equation (1) for the route section j, in that for the parameter $T_i$, the determined random samples of travel times $T_{i,j}$ on the route section j are used, for $T_{min}$ the free travel time on the route section j is used, and for $<T>_I$ the route selection algorithm of one of the quantiles of the old information status can be used. Correspondingly, a time value $G_1$ may be determined for the "updated" traffic information status, in that for the parameter $T_i$ the determined random samples of travel times $T_{i,j}$ on the route section j are used, for $T_{min}$ the free travel time on the route section j is used, and for $<T>_I$ the route selection algorithm of one of the quantiles of the new, current information status can be used.

Using Equation (3), the added values "with and without" may be compared to the new information in that the priority ratio PZ is determined. This comparison may be repeated according to the different possible strategies for route selection using the quantiles for each of the virtually reported travel times considered. The virtual improvements in benefit (depending on the quantile) may then be output using the new traffic information.

The method has a number of advantageous properties. For instance, even when the estimated travel times are similar ($\hat{u}_1 \approx \hat{u}_0$), refining the message accuracy ($M_1 > M_0$) using vehicle-generated data may lead to a quantified added value and (depending on the magnitude of the priority ratio) to the generation of a message. This is possible, e.g. when a "pessimistic" strategy is considered for the route selection. In the case of the "pessimistic" strategy, the refinement means that during a drive there is less buffer time to put up with. In a vehicle-internal method, in which the traffic informational data provided by the traffic service provider are not taken into account, no message is generated and no string of pearls is transferred if the vehicle-internal method does not produce a traffic jam signal. In contrast, with the method introduced herein, the estimate of an increased added value, generation of a message, and transfer of a string of pearls is possible even if the traffic status according to the traffic service provider is a traffic jam (for instance $\hat{u} > 1$), while in accordance with the data generated in the vehicle there is a slight delay (for instance $\hat{u}_1 \ll 1$). Another advantage is that the added value according to Equation (2c) or the priority ratio according to Equation (3) permits comparison over a plurality of route sections. Thus, with the added value and the priority ratio, a value is provided that when needed may be used for controlling the entirety of traffic messages and that may be compared to a global threshold value.

The following indicates how a transfer of traffic informational data may be controlled with the method for variable traffic-adaptive route sections are variable.

Even if the entire travel time for a route between a starting point P and a target point Q is nearly exactly equal to previously available traffic information, it may still happen that the available spatial allocation of relative travel time losses u on route sections has errors within a route. With the embodiment of the method provided in the following, using a more precise or more current division of route sections and of local average speeds on these route sections, the accuracy of this spatial allocation may be improved, so that an added value of the transfer of vehicle-generated data may be created.

The embodiment of the method provided in the following thus relates to the control of the transfer of vehicle-generated data, taking into consideration available traffic information when, for instance using the provision of offsets, traffic information may be transferred on changeable route sections of a route S.

The top of FIG. 2 depicts a route S between the starting point P and the target point Q, which route is divided by a traffic service provider into route sections k that are arranged between route positions $x_k$, where k=1, . . . , K. Traffic informational data on the route sections k may be provided for a vehicle by the traffic service provider.

It is assumed that a traffic information status in the form of traffic informational data of the traffic service provider is available everywhere on the traveled route S. This shall be understood to mean either the presence of a valid traffic message or the absence of a message with the assumption of complete supply on the route S.

On each defined route section k where k=1, . . . , K, the parameters $\hat{u}_{0,k}$, $M_{0,k}$, and $a_{0,k}$ as well as the spatial beginning and the end of the route section may be determined as input data for the method using the message generated by the traffic service provider. Moreover, it is assumed that information on the free speed $V_{free}$ is available on each of these route sections k. The beginning and end of the individual route sections is defined according to available traffic information of the traffic service provider for instance using the route positions 0, $x_1, x_2, \ldots, x_k$, where k=1, 2, . . . K. A route position $x_k$ is thus both the end of the route section k and the beginning of the subsequent route section k+1. The length $L_k$ of a route section k is found with $$L_{0,k} = x_k - x_{k-1} \tag{11}$$

The free travel time $t_{min,0,k}$ on the route section k in accordance with the previous traffic information is calculated as:

$$t_{min,0,k} \equiv \frac{L_{0,k}}{V_{free}} \tag{12}$$

It is now further assumed that in a vehicle during uninterrupted travel on the route S, with the street class and the free speed $V_{free}$ remaining the same, a string of pearls is produced as traffic informational data generated in the vehicle. It is furthermore required that the string of pearls does not last temporally longer than the validity period of the messages, that is, for example 5 minutes. These assumptions do not represent a limitation since a string of pearls could be broken down into smaller strings of pearls that satisfy the assumptions.

In a first method step, a division of the traveled route into route sections j=1, . . . , J is generated from the vehicle-generated string of pearls. At the bottom of FIG. 2, the route S is shown as an example with a different division of route sections j, which are arranged between route positions $y_j$, where j=1, . . . , J. During travel on the route S, traffic informational data are determined by the vehicle, which data are allocated to the individual route sections j. The spatial beginning and the end of the route sections are designated in accordance with the new division by the indication of the route positions 0, $y_1, \ldots, y_j$, where j=1, . . . , J. In such a division, the length of the "new" route section j is:

$$L_{1,j} = y_j - y_{j-1} \tag{13}$$

As may be seen from FIG. 2, divisions with $x_k$ and $y_j$, and therefore also the number K and J of route sections and the lengths of the route sections $L_{0,k}$ and $L_{1,j}$, may be different.

In a second method step it is now indicated how traffic-adaptive division of variable route sections may occur. In accordance with the method, the route S is divided at a route position $y_j$ if a significant change in the previously experienced traffic status occurs at the route position $y_j$. A change in the traffic status has occurred at a route position $y_j$ if the difference between a running speed value in the previously traveled route section and a mean value in a (smaller) spatial window "upstream" of a route position that is between the route position $y_j$ and the target point Q, exceeds a threshold value. The threshold value may be defined as a multiple of, for instance three times, the standard deviation of the speed in the window.

Thus the second method step may be divided into the following sub-steps: First a running expected value of the speed since the beginning of a route section j is determined as a function of the route position $y_j$. Then the mean value and the standard deviation are determined in a spatial window "upstream" of the route position $y_j$. The length of the movable window may be established at the beginning of the second method step and may be for instance 50 m.

In order to determine whether there is a significant change in the traffic status at the route position first the threshold value is defined that, if exceeded, indicates the required significance of the change in traffic status in order to establish an end point of the route section. Then it is checked whether a difference between the running speed value in the previously traveled route section and the mean value in the window exceeds the threshold value. If the threshold value is exceeded and there is thus a significant change in the traffic status, the end of a route section j and the beginning of a new route section j+1 is defined at the route section position $y_j$ just traveled.

In a third method step, the current traffic informational data of a traffic status estimate that are determined on the route sections j while traveling the route S are allocated to the route sections j established in the second method step. To this end, first an average speed $V_{1,j}$ is determined on each route section j. Using the length of a sub-section j determined using Equation (13), the free travel time $t_{min,1,j}$ in accordance with the new traffic information is determined:

$$t_{min,1,j} \equiv \frac{L_{1,j}}{V_{free}} \tag{14}$$

The parameters $\hat{u}_{1,j}$, $M_{1,j}$, and $a_{1,j}$ may now be determined for a route section j according to the following equations:

$$\hat{u}_{1,j} \equiv \frac{V_{free}}{V_{1,j} - 1} \tag{15a}$$

$$M_{1,j=1} \tag{15b}$$

$$a_{1,j} = \frac{1}{CV^2} \tag{15c}$$

CV is the estimated coefficient of variation for the specific route section j, which may be obtained for instance from the ratio of standard deviation and mean value of a distribution of the travel times on the specific route section. The coefficient of variation CV may be calculated to be approximately:

$$CV = 0.3 \cdot \sqrt{\frac{300}{L_{1,j}}} \tag{16}$$

The parameter CV and thus also the parameter $a_{1,j}$ relate to the actual length of the estimated route sections. Thus the somewhat significant inexactness of the travel time for the route sections considered may be taken into account.

In a fourth method step, now virtual report data in the form of median travel times are produced from the traffic informational data $\{L_{1,j}, y_{1,j}, t_{min,1,j}, \hat{u}_{1,j}, M_{1,j}, a_{1,j}\}$ generated in the vehicle. To this end, the median value of the corresponding travel time distribution $T_{1,median,j}$ is determined from these parameters for each sub-section. For the traffic information of the traffic service provider that is already available, the median value of the corresponding travel time distribution $T_{0,median,k}$ is calculated as for each route section, wherein the previous division of the route sections k is used, if available.

In a fifth method step, the added value that results from updating the previous traffic informational data using the new traffic informational data is estimated. Similar to the fixed defined route sections in FIG. 1, the estimate of the added value of updated traffic information is based on a comparison to the previous traffic information of the traffic service provider. The following sub-steps are executed for estimating this added value in the fifth method step.

First, the corresponding hyperparameters in accordance with Equations (9) and (10) are calculated for each route section j based on the newly estimated traffic informational data $\{L_{1,j}, y_{1,j}, y_{1,j}, t_{min,1,j}, \hat{u}_{1,j}, M_{1,j}, a_{1,j}\}$. Using these hyperparameters, a total of i virtual travel times $T_{i,j}$ are found for each route section j. The associated distribution of the relative travel time losses may be determined with the calculated hyperparameters and by means of Equations (8) and (5). Thus with Equation (4) the distribution of the virtual travel times on a route section j is also known. From this distribution it is possible to find the virtual travel times $T_{i,j}$, which are valid as representative random samples for the experience of other vehicles on this route section j. A great number of virtual trajectories, for instance 1000, are generated from this.

For each of these virtual trajectories, the added value of the updated and of the previous traffic information is calculated. The updated traffic information indicates traffic information based on a combination/fusion of the first traffic informational data and the second traffic informational data. For the updated traffic information, it is now possible to allocate a time value $G_1$ for updated traffic information for the N virtual trajectories, each with a number J of route sections j that are defined by the route position $[0, y_1, \ldots, y_J]$ according to the following equation:

$$G_1 = -\sum_{j=1}^{J}\sum_{i=1}^{N}(T_{1,median,j} - t_{min,1,j}) + \varphi\sum_{j=1}^{J}\sum_{i=1}^{N}[(T_{i,j} - t_{min,1,j}) - \max(T_{i,j} - T_{1,median,j}, 0)] \tag{17}$$

As may be seen from FIG. 2, other route sections k that are defined by the route positions $[0, x_1, x_2, \ldots, x_K]$ are allocated to the previous traffic information based on the traffic informational data of the traffic service provider. Thus the travel speed is not constant on each updated route section j with the route positions $[0, y_1, y_2, \ldots, y_J]$. Nevertheless, a time value for the same N virtual trajectories may be allocated to the route sections j in that the median travel times according to the "previous" message status are interpolated onto the route sections j with the route positions $[0, y_1, y_2, \ldots, y_J]$.

Thus auxiliary values $\langle T_0 \rangle$ that represent the virtual median travel times may now be calculated. The time value for the previously valid traffic information may be determined according to the following equation:

$$G_0 = -\sum_{j=1}^{J}\sum_{i=1}^{N}(\langle T \cdot_0\rangle_j - t_{min,1,j}) + \varphi\sum_{j=1}^{J}\sum_{i=1}^{N}[(T_{i,j} - t_{min,1,j}) - \max(T_{i,j} - \langle T \cdot_0\rangle_j, 0)] \tag{18}$$

The "free" travel times $t_{min,1,j}$ also appear in the expression for the time value $G_0$ due to the assumed constant free speed. If the previous traffic information is not divided at all or is only divided into "fixed" route sections, that is, pre-defined route sections, the time value of the previously valid traffic information may also be calculated using the interpolation and thus a time value for the N virtual trajectories may be allocated.

In order now to allocate the priority to a message in the string of pearls, the time value $G_1$ of the virtually updated traffic information and the time value $G_0$ of the traffic information previously known by the traffic service provider are compared to one another. In accordance with Equation (3), this ultimately provides for the priority ratio of the message:

$$PZ = (G_a - G_0) \cdot F \quad (19)$$

Thus in both described application instances a measured value is produced with the priority ratio PZ, which measured value expresses the relative value of transferring a string of pearls generated in a vehicle. It seems reasonable to use the maximum of the two values as the deciding factor for triggering a transfer of the current traffic informational data for updating purposes.

The embodiment of the method for controlling the transfer of vehicle-generated data on fixed route sections and also the most recently described embodiment of the method for controlling the transfer of vehicle-generated data for variable, traffic-adaptive route sections permit intelligent global control of the entirety of messages, in particular XFCD messages. In addition, the priority ratio may be compared for instance to a threshold value that could be transferred to a vehicle. Transfer of the traffic informational data currently acquired in the vehicle for updating previous traffic information could take place only if the priority ratio exceeds the threshold value. Thus the method makes possible an improvement in the efficiency of the benefit of the available communications resources and ultimately an improvement in the quality of the traffic information available in the vehicles.

By determining an added value that the transfer of current traffic informational data has for updating traffic information that is already known, the method permits targeted transmission of messages. In contrast to a method in which strings of pearls are continuously transferred to a traffic service provider for the purposes of updating, it is thus possible to save direct and indirect communications costs. The traffic informational data currently acquired on a route section are also reported in free traffic when there is a "false positive" "traffic jam" traffic situation. Current traffic informational data generated in a vehicle are then even provided, for instance, for a control center for updating the traffic information available there if the available traffic information still indicates a traffic jam, but the traffic jam has just cleared up. Superfluous multiple messages from other vehicles that are traveling on the same route section may be avoided when using the method if a disturbance in traffic has already been reliably detected by a vehicle. However, there may be a new message if an improvement in the reliability of the detected traffic situation has a significant added value. Moreover, the method permits messages to be sent that are clearly differentiated from the "traffic jam" and "no traffic jam" messages in that LOS (Level of Service) levels are differentiated (for instance: freely moving traffic, slow moving traffic). For instance, current traffic informational data may even be provided just as a traffic jam is forming or as it begins to break up.

With the method for controlling the transfer of vehicle-generated data taking into consideration available traffic information, it may even be determined in a vehicle that is traveling on a route section, for which traffic information has been prepared by a traffic service provider, whether the transfer of the traffic informational data generated in the vehicle to the traffic service provider for updating the traffic information available there represents an added value. FIG. 3A depicts a system arrangement made of a vehicle 100 having an apparatus 110 for controlling the transfer of vehicle-generated data taking into account available traffic information that has a computer 111, an electronic data carrier 112, and a data acquisition device 113. The data acquisition device 113 provides the traffic informational data $L_{1,j}$, $y_{1,j}$, $t_{min,1,j}$, $\hat{u}_{1,j}$, $M_{1,j}$, $a_{1,j}$ acquired for instance while traveling a route section. All of the aforesaid method steps of the method may be executed on the computer 111 in the vehicle. In addition, the method steps may be implemented in a program code that is stored on the electronic data carrier 112 or firmware of the computer 111. The computer 111, for instance the processor of a navigation computer, may access the data carrier 112 or the firmware in order to execute the method steps defined there.

If the computer 111 determines that the transfer of the vehicle-generated traffic informational data represents an added value compared to the traffic information available with the traffic service provider for the traveled route section, the vehicle-generated traffic informational data are transferred by a transmitter device 114 of the vehicle to a control center 200 for the traffic service provider. The control center 200 includes an apparatus 210 for updating traffic information and has a computer 211 and a memory unit 213. The memory unit 213 can store the traffic informational data transferred from the vehicle. Using the traffic informational data stored in the memory unit 213 and the traffic informational data that is already available, the computer 211 can then determine updated traffic informational data that may be provided to other vehicles.

Figure 3B:
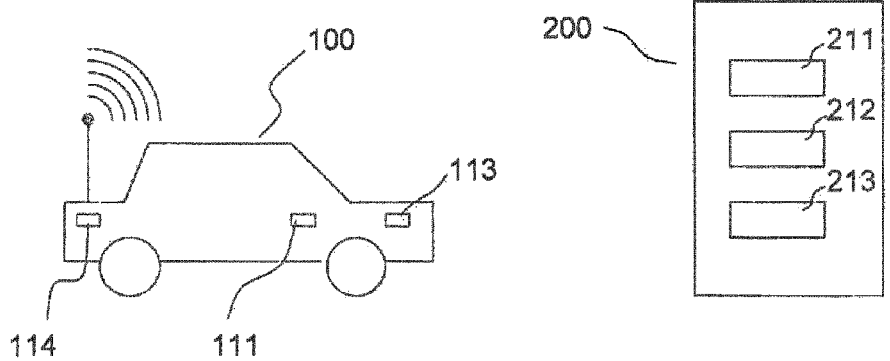
FIG. 3B is another embodiment of a system arrangement for controlling provision of traffic informational data for updating traffic information.

FIG. 3B depicts a system arrangement in which the traffic informational data for the traveled route section that have been obtained in the vehicle with the data acquisition device 113 are first transferred to the control center 200. Components identical to components in FIG. 3A have the same reference numbers. The traffic informational data may be stored in the control center in the memory unit 213. In contrast to the embodiment depicted in FIG. 3A, in the vehicle only the traffic informational data acquired while traveling the route section are acquired with the data acquisition device 113 and transferred by the transmitter device 114 to the control center 200. There the transferred traffic informational data are stored in the memory unit 213. The control center includes an electronic data carrier 212 on which the method steps of the method are stored, in the form of program code, for determining the first and second time values and the priority ratio. As an option, the method steps may be stored in the firmware of the computer 211. The computer 211 may now determine whether the priority ratio exceeds a certain threshold and, as a function of traffic information already present in the control center, may update with the traffic informational data transferred from the vehicle. The updated traffic informational data may be made available by the control center 200 to other vehicles that are traveling on the route section.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle comprising a navigation computer configured to:
provision first traffic informational data that, on first route sections of a route, represent a first traffic information status and of second traffic informational data that on second route sections of the route represent a second traffic information status, wherein the first traffic informational data represent a temporally older traffic information status than the second traffic informational data;
determine a plurality of first travel times for each of the first route sections as a function of the first informational data;
determine at least one characteristic value of a distribution of the first travel times for each first route section;
determine a plurality of second travel times for each of the second route sections as a function of the second traffic informational data;
determine at least one characteristic value of a distribution of the second travel times for each second route section;
determine a first time value for traffic information based on the first traffic informational data as a function of the determined characteristic value of a distribution of the first travel times, wherein the first time value represents a measure of a benefit of the first traffic informational data;
determine a second time value for other traffic information based on a combination of the first traffic informational data and the second traffic informational data as a function of the determined characteristic value of a distribution of the second travel times, wherein the second time value represents a measure for a benefit of the second traffic informational data;
compare the first and second time values to one another; and
determine a priority ratio, based on said comparing of the first and second time values, that characterizes a benefit of providing the second traffic informational data for updating the first traffic informational data, wherein the priority ratio is determined as a function of a difference in the first and second time values and of a number of vehicles to which the updated traffic informational data are made available, and
wherein if the priority ratio exceeds the specified threshold value, the navigation computer is further configured to provide the second traffic informational data for updating the first traffic informational data.

2. The vehicle in accordance with claim 1, wherein an average speed is calculated, by the navigation computer, on each second route section when the section is traveled, and wherein the second traffic informational data is provided, by the navigation computer, for each second route section as a function of the average speed on that second route section, the length of that second route section, and a free speed on that second route section.

3. The vehicle in accordance with claim 1, wherein a plurality of travel times are determined by the navigation computer for each second route section as a function of the second traffic informational data, and the first and second time values are determined as a function of the plurality of travel times determined for each second route section.

4. The vehicle in accordance with claim 1, wherein the navigation computer is further configured to:
determine a free travel time on each second route section,
determine the free travel time allocated to a second route section as a function of a length of that second route section and of the free travel speed allocated to that second route section; and
determine the first and second time values as a function of the free travel time determined for each second route section.

5. The vehicle in accordance with claim 1, wherein the second route sections are defined on the route between a starting point and a target point in that the route is traveled and, between a begin point that is disposed between the starting point and the target point, and a traveled route position of the route, one of the second route sections is defined when a first traffic status between the begin point and the route position differs from an expected second traffic status between the route position and the target point.

6. The vehicle in accordance with claim 1, wherein the second route sections are defined on the route between the starting point and the target point in that the starting point is established as begin position for one of the second route sections and, when the route is traveled, the navigation computer is further configured to:
(a) determine an expected value of a first speed between the begin point and a traveled route position on the route;
(b) determine an average value of a second speed in a spatial range between the traveled route position and the target point;
(c) compare the expected value of the first speed and the average value of the second speed;
(d) establish an end point for the one section of the second route sections as a function of the comparison performed in act (c);
(e) establish the one section of the second route sections between the begin point and the endpoint and definition of the end point as begin point for a second subsequent route section on the established second route section and repetition of acts (a) through (e) if the target point has not yet been traveled; and
(f) establish the one section of the second route sections between the begin point and the target point if the target point has already been traveled.

7. The vehicle in accordance with claim 6, wherein the second route sections are defined in that a standard deviation of the second speed in the spatial region between the traveled route position and the target point is determined and, as a function of the standard deviation, a threshold is determined, and in the comparison between the expected value of the first speed and the average value of the second speed, a difference between the expected value of the first speed and the average value of the second speed is determined and compared to the threshold.

8. The vehicle in accordance with claim 1, wherein the navigation computer is further configured to:
determine a quantile as characterizing value;
determine a median travel time as a quantile of a distribution of the first travel times on each of the first route sections; and
allocate virtual median travel times, based on the first traffic informational data, to the second route sections in that the median travel times for the first route sections are interpolated into the second route sections.

9. The vehicle in accordance with claim 8, wherein the first time value is determined by the navigation computer as a function of the virtual median travel time allocated to each second route section.

10. The vehicle in accordance with claim 1, wherein the navigation computer is further configured to:
  determine a median travel time as a quantile of a distribution of the second travel times on each of the second route sections; and
  determine the second time value as a function of the median travel time allocated to each second route section.

11. An apparatus for controlling provision of traffic informational data for updating traffic information, the apparatus including:
  a computer configured to:
   provision first traffic informational data that, on first route sections of a route, represent a first traffic information status and of second traffic informational data that on second route sections of the route represent a second traffic information status, wherein the first traffic informational data represent a temporally older traffic information status than the second traffic informational data,
   determine a plurality of first travel times for each of the first route sections as a function of the first informational data,
   determine at least one characteristic value of a distribution of the first travel times for each first route section,
   determine a plurality of second travel times for each of the second route sections as a function of the second traffic informational data,
   determine at least one characteristic value of a distribution of the second travel times for each second route section,
   determine a first time value for traffic information based on the first traffic informational data as a function of the determined characteristic value of a distribution of the first travel times, wherein the first time value represents a measure of a benefit of the first traffic informational data,
   determine a second time value for other traffic information based on a combination of the first traffic informational data and the second traffic informational data as a function of the determined characteristic value of a distribution of the second travel times, wherein the second time value represents a measure for a benefit of the second traffic informational data,
   compare the first and second time values to one another, and
   determine a priority ratio, based on said comparison, that characterizes a benefit of providing the second traffic informational data for updating the first traffic informational data, wherein the priority ratio is determined as a function of a difference in the first and second time values and of a number of vehicles to which the updated traffic informational data are made available,
   wherein if the priority ratio exceeds the specified threshold value, the computer is further configured to provide the second traffic informational data for updating the first traffic informational data;
  a data acquisition device for acquiring the second traffic informational data; and
  a transmitter device for transferring the second traffic information data to a control center for updating traffic information, wherein the computer is configured to control the transfer of the second traffic information data as a function of a result of the comparing of the first and second time values.

12. The vehicle in accordance with claim 1, further comprising:
  a data acquisition device for acquiring the second traffic informational data; and
  a transmitter device for transferring the second traffic information data to a control center for updating traffic information, wherein the navigation computer is configured to control the transfer of the second traffic information data as a function of a result of the comparing of the first and second time values.

13. The apparatus in accordance with claim 11, wherein an average speed is calculated, by the computer, on each second route section when the section is traveled, and wherein the second traffic informational data is provided, by the computer, for each second route section as a function of the average speed on that second route section, the length of that second route section, and a free speed on that second route section.

14. The apparatus in accordance with claim 11, wherein a plurality of travel times are determined by the computer for each second route section as a function of the second traffic informational data, and the first and second time values are determined as a function of the plurality of travel times determined for each second route section.

15. The apparatus in accordance with claim 11, wherein the computer is further configured to:
  determine a free travel time on each second route section,
  determine the free travel time allocated to a second route section as a function of a length of that second route section and of the free travel speed allocated to that second route section; and
  determine the first and second time values as a function of the free travel time determined for each second route section.

16. The apparatus in accordance with claim 11, wherein the second route sections are defined on the route between a starting point and a target point in that the route is traveled and, between a begin point that is disposed between the starting point and the target point, and a traveled route position of the route, one of the second route sections is defined when a first traffic status between the begin point and the route position differs from an expected second traffic status between the route position and the target point.

17. The apparatus in accordance with claim 11, wherein the second route sections are defined on the route between the starting point and the target point in that the starting point is established as begin position for one of the second route sections and, when the route is traveled, the computer is further configured to:
  (a) determine an expected value of a first speed between the begin point and a traveled route position on the route;
  (b) determine an average value of a second speed in a spatial range between the traveled route position and the target point;
  (c) compare the expected value of the first speed and the average value of the second speed;
  (d) establish an end point for the one section of the second route sections as a function of the comparison performed in act (c);
  (e) establish the one section of the second route sections between the begin point and the endpoint and definition of the end point as begin point for a second subsequent route section on the established second route section and repetition of acts (a) through (e) if the target point has not yet been traveled; and
  (f) establish the one section of the second route sections between the begin point and the target point if the target point has already been traveled.

18. The apparatus in accordance with claim 11, wherein the computer is further configured to:

determine a quantile as characterizing value;
determine a median travel time as a quantile of a distribution of the first travel times on each of the first route sections; and
allocate virtual median travel times, based on the first traffic informational data, to the second route sections in that the median travel times for the first route sections are interpolated into the second route sections.

19. The apparatus in accordance with claim 18, wherein the first time value is determined by the computer as a function of the virtual median travel time allocated to each second route section.

20. The apparatus in accordance with claim 11, wherein the computer is further configured to:
determine a median travel time as a quantile of a distribution of the second travel times on each of the second route sections; and
determine the second time value as a function of the median travel time allocated to each second route section.

* * * * *